US011404868B2

(12) United States Patent
Jung et al.

(10) Patent No.: US 11,404,868 B2
(45) Date of Patent: Aug. 2, 2022

(54) OVER-VOLTAGE PREVENTION APPARATUS AND METHOD OF DISTRIBUTION LINE CONNECTED WITH DISTRIBUTED GENERATOR

(71) Applicant: KOREA ELECTRIC POWER CORPORATION, Naju-si (KR)

(72) Inventors: Won Wook Jung, Daejeon (KR); Koong Won Nam, Daejeon (KR); Jong Nam Weon, Daejeon (KR); Chang Hoon Shin, Daejeon (KR); Seong Soo Cho, Daejeon (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 273 days.

(21) Appl. No.: 16/776,676

(22) Filed: Jan. 30, 2020

(65) Prior Publication Data
US 2020/0244068 A1 Jul. 30, 2020

(30) Foreign Application Priority Data
Jan. 30, 2019 (KR) .................... 10-2019-0012073

(51) Int. Cl.
*H02H 9/04* (2006.01)
*H02H 7/22* (2006.01)
(Continued)

(52) U.S. Cl.
CPC .............. *H02H 9/045* (2013.01); *G05F 1/14* (2013.01); *H02H 7/065* (2013.01); *H02H 7/226* (2013.01)

(58) Field of Classification Search
CPC .. H02H 3/08; H02H 3/32; H02H 3/38; H02H 3/50; H02H 3/04; H02H 3/105; H02H 3/006; H02H 3/033; H02H 3/347; H02H 3/05; H02H 3/335; H02H 9/002; H02H 7/0833; H02H 7/0844; H02H 7/0852; H02H 7/1225; H02H 7/1255; H02H 7/226; H02H 7/261; H02H 7/08; H02H 7/26; H02H 7/30; H02H 7/265; H02H 7/0822; H02H 7/09; H02H 7/263; H02H 11/001; H02H 11/002;
(Continued)

(56) References Cited

U.S. PATENT DOCUMENTS

2006/0250114 A1* 11/2006 Faberman ................ H02K 3/50
322/24
2007/0035899 A1* 2/2007 Covi .................... H02M 3/1584
361/56

FOREIGN PATENT DOCUMENTS

JP 2008043089 A 2/2008
JP 5933857 B1 6/2016

OTHER PUBLICATIONS

Communication from Korean Intellectual Property Office for Office Action dated Sep. 8, 2020 of the Korean patent application No. 10-2019-0012073, which corresponds to the present application.

* cited by examiner

*Primary Examiner* — Bryan R Perez
(74) *Attorney, Agent, or Firm* — Foundation Law Group, LLP

(57) ABSTRACT

The present disclosure relates to an over-voltage prevention apparatus and method of a distribution line connected with a distributed generator, which sets a range of a dispatched voltage based on a current voltage of a Pole Mounted Automatic Voltage Regulator (PVR) and a voltage at a connection point of a distributed generator to control so that the dispatched voltage is output within the corresponding range.

14 Claims, 4 Drawing Sheets

(51) Int. Cl.
*G05F 1/14* (2006.01)
*H02H 7/06* (2006.01)

(58) Field of Classification Search
CPC .. H02H 11/005; H02H 11/004; H02H 1/0007; H02H 1/06
See application file for complete search history.

[FIG. 1]
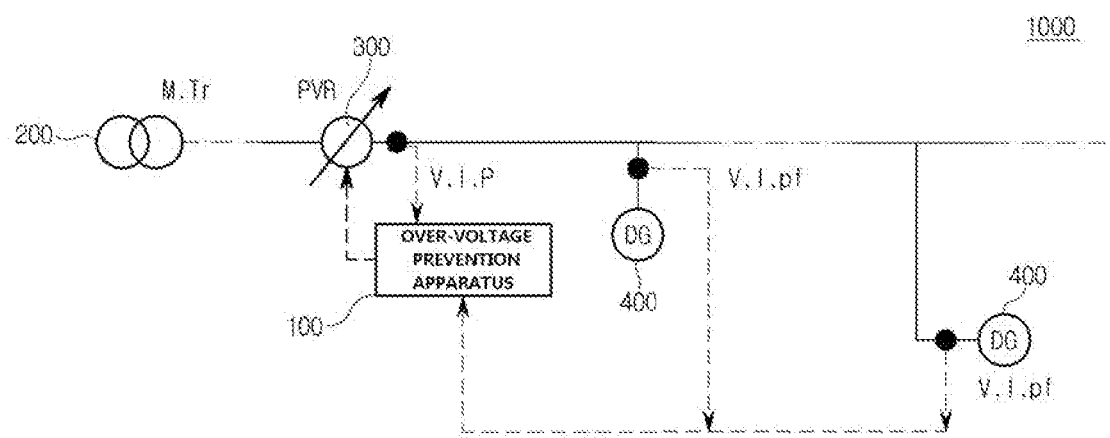
[FIG. 2]
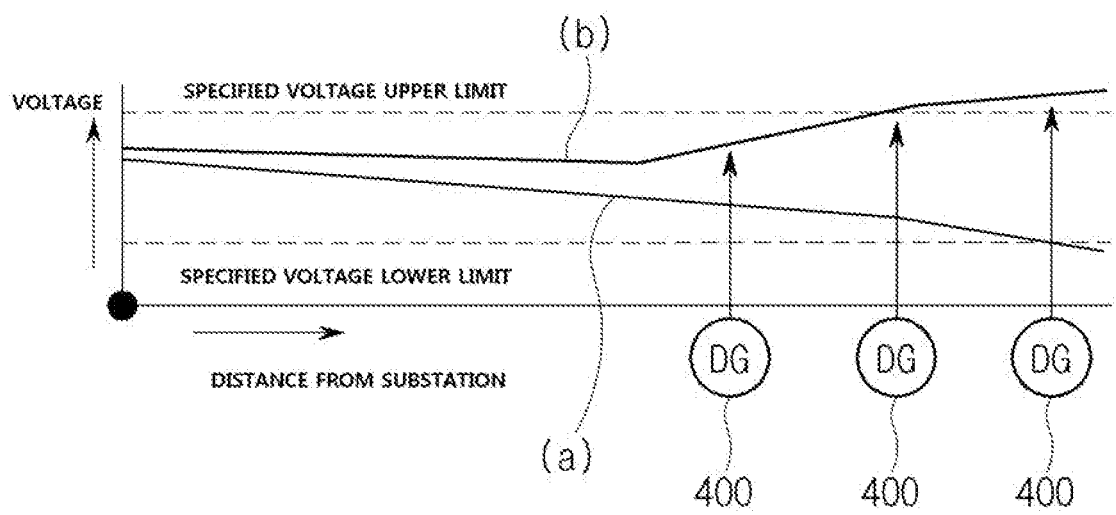

[FIG. 3]
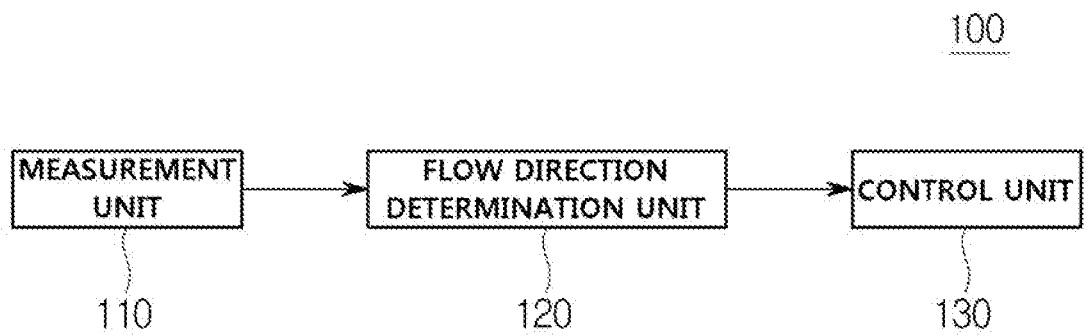
[FIG. 4]
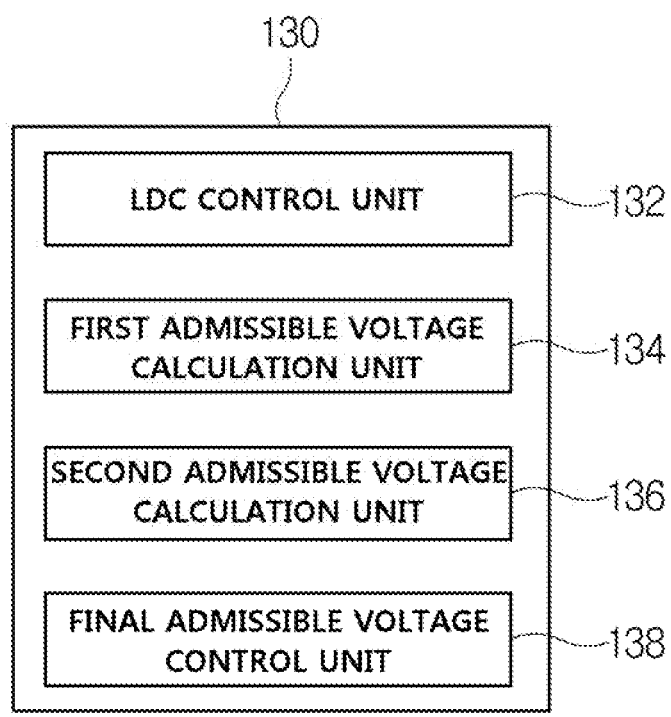

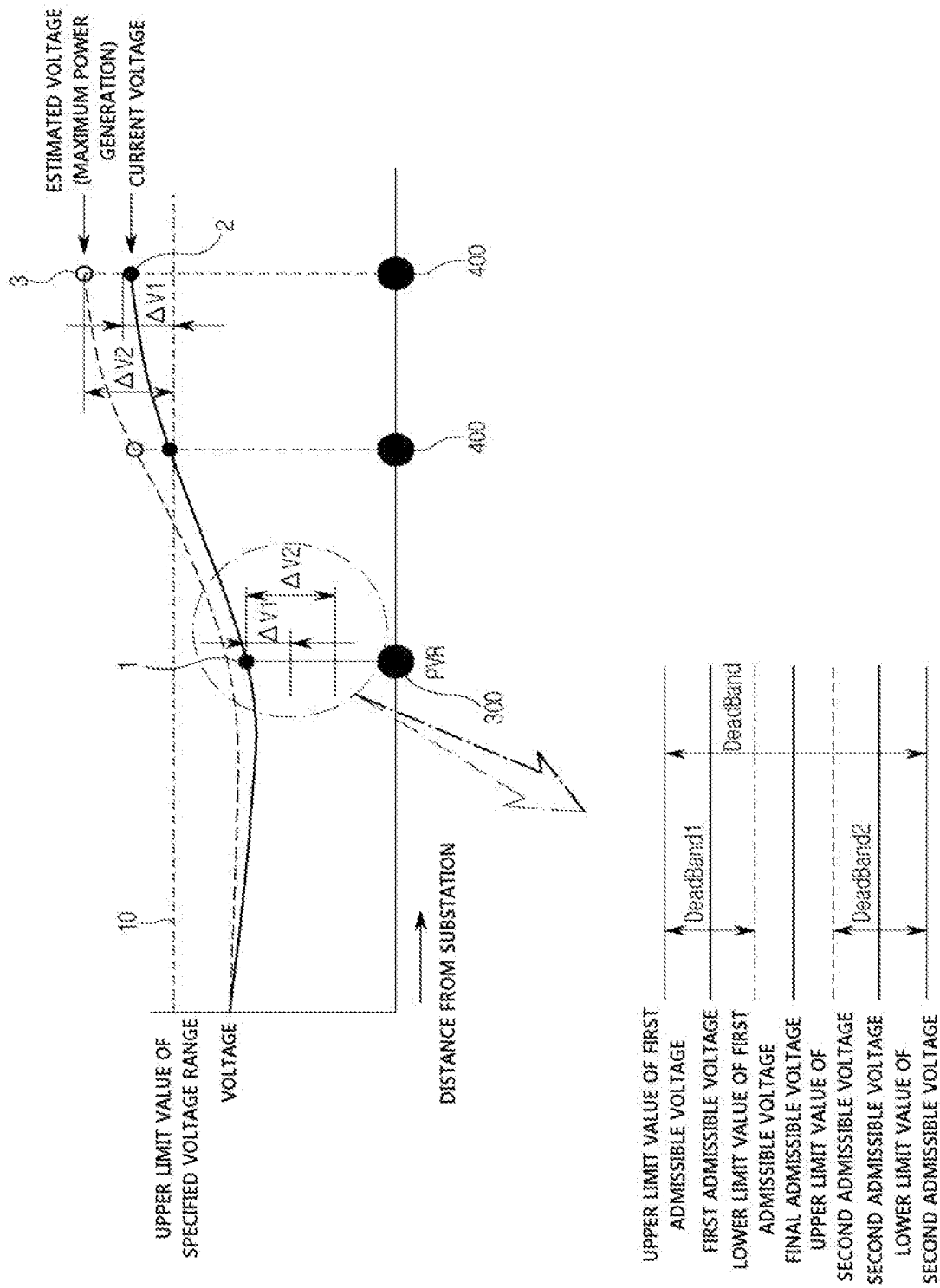

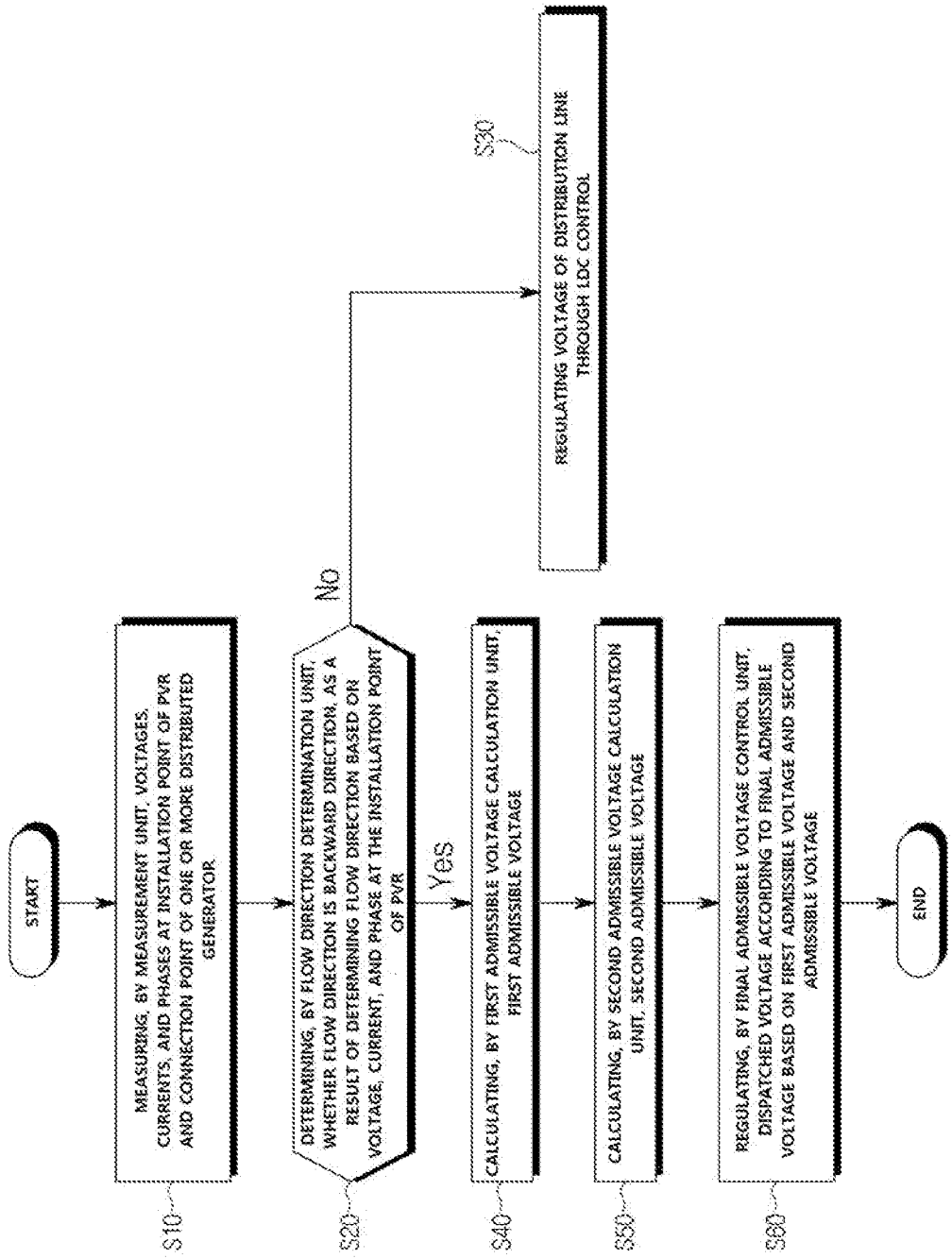
[FIG. 6]

OVER-VOLTAGE PREVENTION APPARATUS AND METHOD OF DISTRIBUTION LINE CONNECTED WITH DISTRIBUTED GENERATOR

CROSS-REFERENCE(S) TO RELATED APPLICATIONS

This application claims priority to Korean Patent Application No. 10-2019-0012073, filed on Jan. 30, 2019, the disclosure of which is incorporated herein by reference in its entirety.

BACKGROUND OF THE DISCLOSURE

Field of the Disclosure

The present disclosure relates to an over-voltage prevention apparatus and method of a distribution line connected with a distributed generator, and more particularly, to an over-voltage prevention apparatus and method of a distribution line connected with a distributed generator, which sets a range of a dispatched voltage based on a current voltage of a Pole Mounted Automatic Voltage Regulator (PVR) and a voltage at the connection point of a distributed generator to control so that the dispatched voltage is output within the corresponding range.

Description of the Related Art

The voltage regulation in the existing distribution system controls a dispatched voltage according to the load condition to collectively regulate the entire voltage of a plurality of distribution lines supplied from the same bank, and installs a Pole Mounted Automatic Voltage Regulator (PVR) to compensate for the voltage in the case of the line with severe voltage drop.

However, if a distributed generator is connected with the distribution line, the possibility of generating an over-voltage increases by exceeding an admissible voltage holding range in some sections by the distributed generator. However, the voltage regulation in the distribution system may not regulate the voltage only with a specific distribution line, and affects entirely the same bank upon the voltage regulation.

Here, the unbalance of the load amount becomes very large between the line not connected with the distributed generator and the line connected with the distributed generator, and in such a system, if the voltage is lowered so that the voltage of the line becomes an admissible voltage due to the generation of the over-voltage in the line connected with the distributed generator, an under-voltage may be generated in the line not connected with the distributed generator while the voltage of the line not connected with the distributed generator is lowered together. As described above, in such a system, it is very difficult to find the dispatched voltage which may allow the voltages of all lines to be admissible voltages.

SUMMARY OF THE DISCLOSURE

The present disclosure is intended to solve the above-described problem, and an object of the present disclosure is to provide an over-voltage prevention apparatus and method of a distribution line connected with a distributed generator, which sets a range of a dispatched voltage based on a current voltage of a Pole Mounted Automatic Voltage Regulator (PVR) and a voltage at the connection point of a distributed generator to control so that the dispatched voltage is output within the corresponding range.

In addition to the object of the present disclosure described above, other features and advantages of the present disclosure will be described below, or will be clearly understood by those skilled in the art to which the present disclosure pertains from such description and description.

An over-voltage prevention apparatus for controlling a dispatched voltage of a distribution line connected with one or more distributed generators by using a PVR according to an embodiment of the present disclosure for achieving the object may include a measurement unit for measuring voltages, currents, and phases at an installation point of the PVR and connection points of the one or more distributed generators, a flow direction determination unit for determining a flow direction based on the voltage, current, and phase at the installation point of the PVR measured by the measurement unit, and a control unit for regulating the dispatched voltage according to the current at the installation point of the PVR, if the flow direction is a forward direction, and regulating the dispatched voltage to satisfy ranges of a first admissible voltage and a second admissible voltage by calculating the first admissible voltage and the second admissible voltage based on the voltages at the connection points of the one or more distributed generators and the voltage at the installation point of the PVR, if the flow direction is a backward direction, as a result of determining the flow direction in the flow direction determination unit.

Here, the flow direction determination unit may determine a direction in which the flow is maintained within a certain time or more as the flow direction.

Here, the control unit may regulate so that the dispatched voltage is increased if the current at the installation point of the PVR is a specific value or more, and may regulate so that the dispatched voltage is lowered if the current at the installation point of the PVR is smaller than the specific value in the case that the flow direction is the forward direction.

Here, the control unit may calculate a first voltage difference, which is the voltage difference between a maximum distributed voltage, which is a maximum voltage among the voltages at the connection points of the one or more distributed generators, and a maximum specified voltage, which is an upper limit value of a specified voltage range of the distribution line in the case that the flow direction is the backward direction.

Here, the control unit may set a voltage obtained by lowering the voltage at the installation point of the PVR by the first voltage difference to an upper limit value of the first admissible voltage, set a voltage obtained by lowering the upper limit value of the first admissible voltage by a predetermined dead band to a lower limit value of the first admissible voltage, and set a median between the upper limit value of the first admissible voltage and the lower limit value of the first admissible voltage to the first admissible voltage.

Here, the control unit may estimate a maximum estimated voltage which is the maximum voltage among the voltages of the distributed generators if outputs of the one or more distributed generators are increased from a current output to 100%, and may calculate a second voltage difference which is the voltage difference between the maximum estimated voltage and a maximum specified voltage, which is an upper limit value of a specified voltage range of the distribution line in the case that the flow direction is the backward direction.

Here, the control unit may set a voltage obtained by lowering the voltage at the installation point of the PVR by the second voltage difference to an upper limit value of the second admissible voltage, set a voltage obtained by lowering the upper limit value of the second admissible voltage by a predetermined dead band to a lower limit value of the second admissible voltage, and set a median between the upper limit value of the second admissible voltage and the lower limit value of the second admissible voltage to the second admissible voltage.

Here, the control unit may set the median between the upper limit value of the first admissible voltage and the lower limit value of the second admissible voltage to a final admissible voltage, and may control so that the dispatched voltage is output as the final admissible voltage.

An over-voltage prevention method of controlling a dispatched voltage of a distribution line connected with one or more distributed generators by using a PVR according to an embodiment of the present disclosure for achieving the object may include measuring, by a measurement unit, voltages, currents, and phases at an installation point of the PVR and connection points of the one or more distributed generators, determining, by a flow direction determination unit, a flow direction based on the voltage, current, and phase at the installation point of the PVR measured by the measurement unit, and regulating, by a control unit, the dispatched voltage according to the current at the installation point of the PVR, if the flow direction is a forward direction, and regulating the dispatched voltage to satisfy ranges of a first admissible voltage and a second admissible voltage by calculating the first admissible voltage and the second admissible voltage based on the voltages at the connection points of the one or more distributed generators and the voltage at the installation point of the PVR, if the flow direction is a backward direction, as a result of determining the flow direction in the flow direction determination unit.

Here, in the determining of the flow direction, the flow direction determination unit may determine a direction in which the flow is maintained within a certain time or more as the flow direction.

Here, in the regulating of the dispatched voltage, the control unit may regulate so that the dispatched voltage is increased if the current at the installation point of the PVR is a specific value or more, and may regulate so that the dispatched voltage is lowered if the current at the installation point of the PVR is smaller than the specific value in the case that the flow direction is the forward direction.

Here, in the regulating of the dispatched voltage, the control unit may calculate a first voltage difference, which is the voltage difference between a maximum distributed voltage, which is a maximum voltage among the voltages at the connection points of the one or more distributed generators, and a maximum specified voltage, which is an upper limit value of a specified voltage range of the distribution line in the case that the flow direction is the backward direction.

Here, in the regulating of the dispatched voltage, the control unit may set a voltage obtained by lowering the voltage at the installation point of the PVR by the first voltage difference to an upper limit value of the first admissible voltage, set a voltage obtained by lowering the upper limit value of the first admissible voltage by a predetermined dead band to a lower limit value of the first admissible voltage, and set a median between the upper limit value of the first admissible voltage and the lower limit value of the first admissible voltage to the first admissible voltage.

Here, in the regulating of the dispatched voltage, the control unit may estimate a maximum estimated voltage which is the maximum voltage among the voltages of the distributed generators if outputs of the one or more distributed generators are increased from a current output to 100%, and may calculate a second voltage difference which is the voltage difference between the maximum estimated voltage and a maximum specified voltage, which is an upper limit value of a specified voltage range of the distribution line in the case that the flow direction is the backward direction.

Here, in the regulating of the dispatched voltage, the control unit may set a voltage obtained by lowering the voltage at the installation point of the PVR by the second voltage difference to an upper limit value of the second admissible voltage, set a voltage obtained by lowering the upper limit value of the second admissible voltage by a predetermined dead band to a lower limit value of the second admissible voltage, and set a median between the upper limit value of the second admissible voltage and the lower limit value of the second admissible voltage to the second admissible voltage.

Here, in the regulating of the dispatched voltage, the control unit may set the median between the upper limit value of the first admissible voltage and the lower limit value of the second admissible voltage to a final admissible voltage, and may control so that the dispatched voltage is output as the final admissible voltage.

The over-voltage prevention apparatus and method of the distribution line connected with the distributed generator according to an embodiment of the present disclosure may set the range of the dispatched voltage in order for the voltage of the distribution line not to become an over-voltage to control so that the dispatched voltage is output within the corresponding range, thereby preventing the over-voltage from being generated in the distribution line.

Further, other features and advantages of the present disclosure may also be newly confirmed through the embodiments of the present disclosure.

BRIEF DESCRIPTION OF THE DRAWINGS

FIG. 1 is a diagram showing an over-voltage prevention system of a distribution line connected with a distributed generator according to an embodiment of the present disclosure.

FIG. 2 is a diagram showing a voltage according to the connection of the distributed generator.

FIG. 3 is a diagram showing a configuration of an over-voltage prevention apparatus of the distribution line connected with the distributed generator according to an embodiment of the present disclosure.

FIG. 4 is a diagram showing a configuration of a control unit according to an embodiment of the present disclosure.

FIG. 5 is a diagram showing a range of a final admissible voltage according to an embodiment of the present disclosure.

FIG. 6 is a diagram showing an over-voltage prevention method of the distribution line connected with the distributed generator according to an embodiment of the present disclosure.

DESCRIPTION OF SPECIFIC EMBODIMENTS

The terminology used herein is merely for the purpose of describing particular embodiments, and is not intended to limit the present disclosure. The singular forms used herein also include plural forms, unless the phrases clearly indicate the opposite. The meaning of "comprising" used herein specifies a particular characteristic, region, integer, step, operation, element and/or component, and does not exclude the presence or addition of other characteristics, regions, integers, steps, operations, elements and/or components.

Unless defined otherwise, all terms including technical terms and scientific terms used herein have the same meaning as commonly understood by those skilled in the art to which the present disclosure pertains. Commonly defined terms used are additionally interpreted to have a meaning consistent with the related technical literature and the presently disclosed contents, and are not interpreted in an ideal or very formal sense unless defined.

Hereinafter, embodiments of the present disclosure will be described in detail with reference to the accompanying drawings so that those skilled in the art to which the present disclosure pertains may easily carry out the present disclosure. However, the present disclosure may be implemented in various different forms and is not limited to the embodiments described herein.

FIG. 1 is a diagram showing an over-voltage prevention system of a distribution line connected with a distributed generator according to an embodiment of the present disclosure.

Referring to FIG. 1, an over-voltage prevention system 1000 of a distribution line connected with a distributed generator according to an embodiment of the present disclosure may include an over-voltage prevention apparatus 100, a main transformer 200, and a Pole Mounted Automatic Voltage Regulator (PVR) 300, and a connection point of a distributed generator 400 connected with the distributed generator may be provided to the below end of the installation point of the PVR 300.

Voltage regulation in a distribution system may control an On-Load Tap Changer (OLTC) of the main transformer 200 to regulate a dispatched voltage according to the load condition, thereby collectively regulating the entire voltage of a plurality of distribution lines supplied from the same bank.

Here, the PVR 300 may be installed to the line which does not solve the under-voltage problem only by regulating the dispatched voltage of the main transformer due to the severe voltage drop, thereby compensating for the voltage. However, if the distributed generator is connected with the distribution line, the entire voltage of the distribution line is increased, and as the capacity of the distributed generator increases, an over-voltage exceeding a specified voltage is generated in some sections of the distribution line. However, if both the distribution line connected with the distributed generator and the distribution line not connected with the distributed generator are included in the same bank of the main transformer 200, it may be difficult to determine the magnitude of the dispatched voltage which allows all the lines to satisfy the specified voltage range.

Further, a load may be installed to the distribution line, and in the case of the distribution line not connected with the distributed generator, the output amount of the distributed generator may be smaller than the load amount, thereby decreasing the voltage of the distribution line. On the other hand, in the case of the distribution line connected with the distributed generator, the output amount of the distributed generator may be greater than the load amount, thereby increasing the voltage of the distribution line. Therefore, the voltage difference between the distribution line connected with the distributed generator and the distribution line not connected with the distributed generator may be large, and therefore, the over-voltage prevention apparatus 100 according to an embodiment of the present disclosure may calculate the voltage range which allows all voltages of the distribution line connected with the distributed generator and the distribution line not connected with the distributed generator to satisfy the specified voltage range, and may regulate so that the dispatched voltage is output within the calculated voltage range.

FIG. 2 is a diagram showing a voltage according to the connection of the distributed generator.

Referring to FIGS. 1 and 2, (a) may represent a voltage of the distribution line not connected with the distributed generator, and (b) may represent a voltage of the distribution line connected with the distributed generator.

As in the (a), if the distributed generator is not connected, a voltage drop occurs in the distribution line according to the load amount of the distribution line, but as in the (b), if the distributed generator is connected, a voltage boost occurs in the distribution line according to the generation amount of the distributed generator. However, it may be difficult to determine the dispatched voltage which allows all the lines to satisfy the specified voltage range if both the distribution line connected with the distributed generator and the distribution line not connected with the distributed generator are included in the same bank of the main transformer.

That is, if the dispatched voltage is increased to solve the under-voltage generated in the distribution line in the (a), the voltage of the distribution line in the (b) may also increase, thereby generating an over-voltage in the distribution line in the (b). On the other hand, if the dispatched voltage is decreased to solve the over-voltage generated in the distribution line in the (b), the voltage of the distribution line in the (a) may also be decreased, thereby generating the under-voltage in the distribution line in the (a). Therefore, the over-voltage prevention apparatus 100 according to an embodiment of the present disclosure may control the output power factor of the distributed generator 400, and may calculate an admissible range of the dispatched voltage by using the voltage at the installation point of the PVR 300 and the voltage at the connection point of the distributed generator 400 to control the dispatched voltage so that the dispatched voltage may be output within the admissible range.

FIG. 3 is a diagram showing a configuration of the over-voltage prevention apparatus of the distribution line connected with the distributed generator according to an embodiment of the present disclosure.

Referring to FIG. 3, the over-voltage prevention apparatus 100 of the distribution line connected with the distributed generator according to an embodiment of the present disclosure may include a measurement unit 110, a flow direction determination unit 120, and a control unit 130.

The measurement unit 110 may measure the voltages, currents, and phases of the installation point of the PVR 300 and connection points of one or more distributed generators 400. The measurement unit 110 may measure the voltages, currents, and phases at the connection points of all the distributed generators 400 if the connection point of the distributed generator 400 is one or more.

The flow direction determination unit 120 may determine the flow direction based on the voltage, current, and phase of the installation point of the PVR 300 measured by the measurement unit 110. Further, the flow direction determination unit 120 may determine that the backward flow has been generated with respect to the installation point of the PVR 300 if the output amount of the distributed generator is greater than the load amount, and may determine that the forward flow has been generated with respect to the installation point of the PVR 300 if the output amount of the distributed generator is smaller than the load amount.

Further, the flow direction determination unit 120 may determine a direction in which the flow is maintained within a certain time or more as the flow direction. This may be for preventing the problem in which a control method is continuously changed as the flow direction is changed frequently. That is, if the flow direction is changed frequently for a short time, a dispatched voltage control method should also be changed according to the flow direction, but even if the dispatched voltage control method is changed, the flow direction may be changed again, thereby changing the dispatched voltage control method again. Therefore, the control method may be changed even before the dispatched voltage is controlled through the corresponding control method, which may be very inefficient. Therefore, if the flow direction is maintained within a certain time or more, the control for regulating the dispatched voltage is driven, thereby efficiently controlling the dispatched voltage.

Therefore, the flow direction determination unit 120 may determine the flow direction as a forward direction if the flow direction is maintained to the forward direction within a certain time or more. Further, the flow direction determination unit 120 may determine the flow direction as a backward direction if the flow direction is maintained to the backward direction within a certain time.

The control unit 130 may regulate the dispatched voltage according to the result of determining the flow direction by the flow direction determination unit 120. Specifically, the control unit 130 may regulate the dispatched voltage according to the current of the installation point of the PVR 300 if the flow direction is the forward direction. On the other hand, the control unit 130 may calculate a first admissible voltage and a second admissible voltage based on the voltages at the connection points of one or more distributed generators 400 and the voltage at the installation point of the PVR 300 if the flow direction is the backward direction to regulate the dispatched voltage within a range between the first admissible voltage and the second admissible voltage.

That is, if the output amount of the distributed generator is smaller than the load amount to generate the forward flow, the voltage of the distribution line may be lowered. In this case, the voltage may be increased by the output of the distributed generator but is not increased enough to generate the over-voltage, such that the control unit 130 may increase the dispatched voltage to control so that the voltage of the distribution line satisfies the specified voltage range. Here, the control unit 130 may regulate the dispatched voltage through a tap control through the PVR 300, and the specified voltage range may be a range of the voltage which is determined that the voltage of the distribution line is normal. That is, if the voltage of the distribution line exceeds the upper limit value of the specified voltage range, it may be determined to be an over-voltage, and if the voltage of the distribution line does not reach the lower limit value of the specified voltage range, it may be determined to be an under-voltage. Therefore, the control unit 130 basically regulates the dispatched voltage so that the voltage of the distribution line is within the specified voltage range.

On the other hand, if the output amount of the distributed generator is greater than the load amount to generate the backward flow, the voltage of the distribution line may be increased. In this case, the control unit 130 may set the range of the dispatched voltage by regulating the dispatched voltage so that the voltage at the connection point of the distributed generator 400 does not become an over-voltage. That is, the control unit 130 may calculate the admissible voltage range for allowing the voltage of the distribution line to satisfy the specified voltage range by using the distribution line voltage at the connection point of the distributed generator 400 according to the current output of the distributed generator and the distribution line voltage at the connection point of the distributed generator 400 estimated when the output of the distributed generator increases. Here, the control unit 130 may calculate the first admissible voltage, which is the upper limit value of the admissible voltage range and the second admissible voltage, which is the lower limit value of the admissible voltage range.

Here, the over-voltage of the distribution line may be eliminated by regulating the dispatched voltage to be the first admissible voltage or less. However, the dispatched voltage may be continuously decreased by the load, and the under-voltage may be generated in the distribution line until the dispatched voltage is increased if the output of the distributed generator is abruptly decreased or the flow direction of the PVR 300 is changed to the forward direction in a state where the dispatched voltage has been excessively lowered. In order to solve this problem, the second admissible voltage may be set to regulate so that the dispatched voltage is not decreased to the second admissible voltage or less. Therefore, according to an embodiment of the present disclosure, the dispatched voltage may be regulated to satisfy the admissible voltage range so that an over-voltage and an under-voltage are not generated in the distribution line by the distributed generator.

FIG. 4 is a diagram showing a configuration of the control unit according to an embodiment of the present disclosure.

Referring to FIGS. 3 and 4, the control unit 130 according to an embodiment of the present disclosure may include an LDC control unit 132, a first admissible voltage calculation unit 134, a second admissible voltage calculation unit 136, and a final admissible voltage control unit 138.

The LDC control unit 132 may regulate the voltage of the distribution line through a Line voltage Drop Compensation (LDC) control. Here, the LDC control may be a method of regulating a secondary voltage of the PVR 300 according to the magnitude of the current flowing through the PVR 300. Specifically, if the current flowing through the PVR 300 is a specific value or more, the voltage drop of the distribution line becomes large, such that in order to compensate for this, the LDC control unit 132 may regulate the secondary voltage of the PVR 300 to a high value. Therefore, the voltage of the distribution line may be increased, thereby compensating for the lowered voltage. On the other hand, if the current flowing through the PVR 300 is smaller than the specific value, the voltage drop of the distribution line is small, such that in order to compensate for this, the LDC control unit 132 may regulate the secondary voltage of the PVR 300 to a low value. Therefore, the voltage of the distribution line may be increased, thereby compensating for the lowered voltage. At this time, the LDC control unit 132 may regulate the dispatched voltage according to the current flowing through the PVR 300 to compensate for the voltage through the large voltage in the distribution line in which a large amount of voltage drop is generated, and to compensate for the voltage through the small voltage in the distribution line in which a small amount of voltage drop is generated. That is, the LDC control unit 132 may regulate the dispatched voltage according to the magnitude of the current flowing through the PVR 300 to regulate so that the secondary side voltage of the PVR 300 is increased.

The first admissible voltage calculation unit 134, the second admissible voltage calculation unit 136, and the final admissible voltage control unit 138 may be configurations of operating in a case where the flow direction determined by the flow direction determination unit 120 is the backward direction.

The first admissible voltage calculation unit 134 may calculate a first voltage difference which is the voltage difference between the maximum distributed voltage, which is the maximum voltage among the voltages at the connection points of one or more distributed generators 400 and the maximum specified voltage, which is the upper limit value of the specified voltage range if the flow direction is the backward direction. That is, the first admissible voltage calculation unit 134 may determine the voltage at the connection points of the one or more distributed generators 400 to determine the maximum distributed voltage, which is the maximum voltage, among them. At this time, if the maximum distributed voltage is an over-voltage, the voltages at the connection points of the distributed generator 400 may not become the over-voltage either if the dispatched voltage is lowered so that the maximum distributed voltage does not become the over-voltage. Therefore, the first admissible voltage calculation unit 134 may regulate the dispatched voltage based on the maximum distributed voltage, thereby preventing the over-voltage.

Further, the first admissible voltage calculation unit 134 may calculate the first voltage difference, which is the difference between the maximum distributed voltage and the maximum specified voltage, to determine how degree the maximum distributed voltage should be lowered to satisfy the specified voltage range.

Further, the first admissible voltage calculation unit 134 may lower the voltage at the installation point of the PVR 300 by the first voltage difference, and set the voltage obtained by lowering the voltage at the installation point of the PVR 300 by the first voltage difference to the upper limit value of the first admissible voltage. That is, since the voltage obtained by lowering the voltage at the installation point of the PVR 300 by the first voltage difference is the maximum voltage value for the maximum distributed voltage to satisfy the specified voltage range, it may be set to the upper limit value of the first admissible voltage so that the dispatched voltage does not exceed this voltage, thereby preventing an over-voltage from being generated.

Further, the first admissible voltage calculation unit 134 may apply a predetermined DeadBand1 from the upper limit value of the first admissible voltage. The first admissible voltage calculation unit 134 may set the voltage obtained by lowering the upper limit value of the first admissible voltage by the predetermined DeadBand1 to the lower limit value of the first admissible voltage. Here, the first admissible voltage calculation unit 134 may set a median between the upper limit value of the first admissible voltage and the lower limit value of the first admissible voltage to the first admissible voltage.

Further, the second admissible voltage calculation unit 136 may calculate the second admissible voltage by calculating a voltage increment of the distribution line by the distributed generator if the flow direction is the backward direction.

Specifically, the second admissible voltage calculation unit 136 may classify the distributed generator into a distributed generator capable of a power factor control and a distributed generator incapable of a power factor control, and may calculate a voltage increment in each case. The second admissible voltage calculation unit 136 may calculate the voltage increment if the current output of the distributed generator incapable of the power factor control is increased to 100%. Here, the second admissible voltage calculation unit 136 may calculate an increased current by calculating the difference between the rated current of the distributed generator and the current output current of each distributed generator. The second admissible voltage calculation unit 136 may obtain the voltage increment according to the increase in the output of the distributed generator by using the impedance when viewing the system side from the connection point of the distributed generator 400 and the operating power factor of the distributed generator. Here, the operating power factor at the maximum output of the distributed generator incapable of the power factor control may be set to 1. The second admissible voltage calculation unit 136 may obtain the voltage increment if the current output is increased by 100% by summing the voltage increment of each distributed generator.

On the other hand, the second admissible voltage calculation unit 136 may calculate the voltage decrement if the current output of the distributed generator capable of the power factor control is decreased to 0%, and may calculate the voltage increment if the current output is increased to 100%. Further, the second admissible voltage calculation unit 136 may calculate the voltage increment if the output of the distributed generator capable of the power factor control increases from 0% to 100%. Here, the second admissible voltage calculation unit 136 may calculate the voltage decrement of a case where the current output of the distributed generator capable of the power factor control is decreased to 0%, the voltage increment of a case where the current output is increased to 100%, and the voltage increment if the output of the distributed generator increases from 0% to 100% in the same method as the method of calculating the voltage increment in the distributed generator incapable of the power factor control.

Further, the second admissible voltage calculation unit 136 may obtain the voltage increment of a case where the output increases from the current output to 100% through the calculated voltage decrement and voltage increments. That is, the second admissible voltage calculation unit 136 may sum the maximum distributed voltage, which is the maximum voltage among the voltages at the connection points of the distributed generators 400, the voltage increment calculated by the distributed generator incapable of the power factor control, and the voltage increment calculated by the distributed generator capable of the power factor control, and may subtract the voltage decrement calculated by the distributed generator capable of the power factor control to estimate the maximum estimated voltage, which is the maximum voltage of a case where the outputs of the distributed generators are increased to 100%.

The second admissible voltage calculation unit 136 may calculate a second voltage difference which is the voltage difference between the estimated maximum estimated voltage and the maximum specified voltage, which is the upper limit value of the specified voltage range, and may lower the voltage at the installation point of the PVR 300 by the second voltage difference. The second admissible voltage calculation unit 136 may set the voltage obtained by lowering the voltage at the installation point of the PVR 300 by the second voltage difference to the upper limit value of the second admissible voltage. Here, the maximum estimated voltage is a voltage of a case where the output is 100%, and may be a value which is greater than the maximum distributed voltage indicating the current output, and therefore, the second voltage difference may be greater than the first voltage difference. Therefore, the second admissible voltage obtained by lowering the voltage at the installation point of the PVR 300 by the second voltage difference may be a value which is lower than the first admissible voltage.

Further, the second admissible voltage calculation unit 136 may apply a predetermined dead band(DeadBand2) from the upper limit value of the second admissible voltage. The second admissible voltage calculation unit 136 may set a voltage obtained by lowering the upper limit value of the second admissible voltage by a predetermined dead band (DeadBand2) to the lower limit value of the second admissible voltage. Here, the second admissible voltage calculation unit 136 may set a median between the upper limit value of the second admissible voltage and the lower limit value of the second admissible voltage to the second admissible voltage.

The final admissible voltage control unit 138 may calculate the final admissible voltage. The final admissible voltage control unit 138 may set the upper limit value of the first admissible voltage and the lower limit value of the second admissible voltage to the range of the final admissible voltage, and determine the median between the upper limit value of the first admissible voltage and the lower limit value of the second admissible voltage as a final admissible voltage. Here, the range of the final admissible voltage may be for compensating for the error of the final admissible voltage. That is, the range of the final admissible voltage may be a range in which an over-voltage and an under-voltage are not generated in the distribution line. The final admissible voltage control unit 138 may regulate the dispatched voltage so that the dispatched voltage is output within the range of the final admissible voltage. The control unit 130 according to an embodiment of the present disclosure may set the output range of the dispatched voltage which allows the over-voltage not to be generated in the distribution line so that the dispatched voltage is output within the output range.

FIG. 5 is a diagram showing the range of the final admissible voltage according to an embodiment of the present disclosure.

Referring to FIGS. 4 and 5, if the flow direction is the backward direction, the first admissible voltage calculation unit 134 may calculate the first voltage difference ($\Delta V1$) which is the voltage difference between the maximum distributed voltage 2, which is the maximum voltage among the voltages at the connection points of one or more distributed generators 400, and the maximum specified voltage 10, which is the upper limit value of the specified voltage range. The first admissible voltage calculation unit 134 may lower the voltage 1 at the installation point of the PVR 300 by the first voltage difference ($\Delta V1$), and may set a voltage obtained by lowering the voltage 1 at the installation point of the PVR 300 by the first voltage difference ($\Delta V1$) to the upper limit value of the first admissible voltage. Further, the first admissible voltage calculation unit 134 may apply a predetermined dead band(DeadBand1) from the upper limit value of the first admissible voltage to set a voltage obtained by lowering the upper limit value of the first admissible voltage by the predetermined dead band(DeadBand1) to the lower limit value of the first admissible voltage. Here, the first admissible voltage calculation unit 134 may set a median between the upper limit value of the first admissible voltage and the lower limit value of the first admissible voltage as the first admissible voltage.

Further, the second admissible voltage calculation unit 136 may estimate the maximum estimated voltage 3, which is the maximum voltage of a case where outputs of one or more distributed generators are increased from the current output to 100%, and may calculate the second voltage difference ($\Delta V2$), which is the voltage difference between the maximum estimated voltage 3 and the maximum specified voltage 10 which is the upper limit value of the specified voltage range. The second admissible voltage calculation unit 136 may lower the voltage 1 at the installation point of the PVR 300 by the second voltage difference ($\Delta V2$), and may set the voltage obtained by lowering the voltage 1 at the installation point of the PVR 300 by the second voltage difference ($\Delta V2$) as the upper limit value of the second admissible voltage. Further, the second admissible voltage calculation unit 136 may apply the predetermined dead band(DeadBand2) from the upper limit value of the second admissible voltage to set the voltage obtained by lowering the upper limit value of the second admissible voltage by the predetermined dead band(DeadBand2) to the lower limit value of the second admissible voltage. Here, the second admissible voltage calculation unit 136 may set the median between the upper limit value of the second admissible voltage and the lower limit value of the second admissible voltage as the second admissible voltage.

Also, the final admissible voltage control unit 138 may regulate the dispatched voltage according to the final admissible voltage. The final admissible voltage control unit 138 may set the upper limit value of the first admissible voltage and the lower limit value of the second admissible voltage to the range of the final admissible voltage, and determine the median between the upper limit value of the first admissible voltage and the lower limit value of the second admissible voltage as the final admissible voltage. The final admissible voltage control unit 138 may regulate the dispatched voltage so that the dispatched voltage is output within the final admissible voltage range, thereby preventing an over-voltage from being generated in the distribution line.

FIG. 6 is a diagram showing an over-voltage prevention method of the distribution line connected with the distributed generator according to an embodiment of the present disclosure.

Referring to FIGS. 3 and 6, the measurement unit 110 may measure the voltages, currents, and phases at the installation point of the PVR 300 and the connection points of one or more distributed generators 400 (S10). The measurement unit 110 may measure the voltages, currents, and phases at the connection points of all the distributed generators 400 if the connection point of the distributed generator 400 is one or more.

The flow direction determination unit 120 may determine whether the flow direction is the backward direction based on the voltage, current, and phase at the installation point of the PVR 300 measured by the measurement unit 110 (S20). Here, the flow direction determination unit 120 may determine that the backward flow has been generated with respect to the installation point of the PVR 300 if the output amount of the distributed generator is greater than the load amount, and may determine that the forward flow has been generated with respect to the installation point of the PVR 300 if the output amount of the distributed generator is smaller than the load amount. Further, the flow direction determination unit 120 may determine a direction in which the flow is maintained within a certain time or more as the flow direction in order to prevent the problem in which the control method is continuously changed as the flow direction is changed frequently.

If the flow direction is the forward direction, the LDC control unit 132 may regulate the voltage of the distribution line through the Line voltage Drop Compensation (LDC) control (S30). Specifically, the LDC control unit 132 may regulate the secondary voltage of the PVR 300 to a high value if the current flowing through the PVR 300 is a specific value or more, and may regulate the secondary voltage of the PVR 300 to a low value if it is smaller than the specific value.

If the flow direction is the backward direction, the first admissible voltage calculation unit 134 may calculate the first admissible voltage (S40).

The first admissible voltage calculation unit 134 may calculate the first voltage difference (ΔV1) which is the voltage difference between the maximum distributed voltage 2, which is the maximum voltage among the voltages at the connection points of one or more distributed generators 400, and the maximum specified voltage 10, which is the upper limit value of the specified voltage range. The first admissible voltage calculation unit 134 may lower the voltage 1 at the installation point of the PVR 300 by the first voltage difference (ΔV1), and set the voltage obtained by lowering the voltage 1 at the installation point of the PVR 300 by the first voltage difference (ΔV1) to the upper limit value of the first admissible voltage. Further, the first admissible voltage calculation unit 134 may apply the predetermined dead band(DeadBand1) from the upper limit value of the first admissible voltage to set the voltage obtained by lowering the upper limit value of the first admissible voltage by the predetermined dead band(DeadBand1) to the lower limit value of the first admissible voltage. Here, the first admissible voltage calculation unit 134 may set the median between the upper limit value of the first admissible voltage and the lower limit value of the first admissible voltage to the first admissible voltage.

Further, if the flow direction is the backward direction, the second admissible voltage calculation unit 136 may calculate the second admissible voltage (S50).

The second admissible voltage calculation unit 136 may estimate the maximum estimated voltage 3 which is the maximum voltage of a case where the outputs of one or more distributed generators are increased from the current output to 100%, and may calculate the second voltage difference (ΔV2), which is the voltage difference between the maximum estimated voltage 3 and the maximum specified voltage 10 which is the upper limit value of the specified voltage range. The second admissible voltage calculation unit 136 may lower the voltage 1 at the installation point of the PVR 300 by the second voltage difference (ΔV2), and may set the voltage obtained by lowering the voltage 1 at the installation point of the PVR 300 by the second voltage difference (ΔV2) as the upper limit value of the second admissible voltage. Further, the second admissible voltage calculation unit 136 may apply the predetermined dead band(DeadBand2) from the upper limit value of the second admissible voltage to set the voltage obtained by lowering the upper limit value of the second admissible voltage by the predetermined dead band (DeadBand2) to the lower limit value of the second admissible voltage. Here, the second admissible voltage calculation unit 136 may set the median between the upper limit value of the second admissible voltage and the lower limit value of the second admissible voltage to the second admissible voltage.

Subsequently, the final admissible voltage control unit 138 may regulate the dispatched voltage according to the final admissible voltage (S60). The final admissible voltage control unit 138 may set the upper limit value of the first admissible voltage and the lower limit value of the second admissible voltage to the range of the final admissible voltage, and may determine a median between the upper limit value of the first admissible voltage and the lower limit value of the second admissible voltage as the final admissible voltage. The final admissible voltage control unit 138 may regulate the dispatched voltage so that the dispatched voltage is output within the final admissible voltage range, thereby preventing an over-voltage from being generated in the distribution line.

As described above, according to an embodiment of the present disclosure, it is possible to realize the over-voltage prevention apparatus and method of the distribution line connected with the distributed generator, which set the range of the dispatched voltage based on the current voltage of the PVR and the voltage at the connection point of the distributed generator to control so that the dispatched voltage is output within the corresponding range.

Since those skilled in the art to which the present disclosure pertains may carry out the present disclosure in other specific forms without changing the technical spirit or essential features, it should be understood that the embodiments described above are illustrative in all respects and are not limitative. The scope of the present disclosure is defined by the following claims rather than the detailed description, and all changed or modified forms derived from the meaning and scope of the claims and their equivalents should be construed as being included in the scope of the present disclosure.

What is claimed is:

1. An over-voltage prevention apparatus for controlling a dispatched voltage of a distribution line connected with one or more distributed generators by using a Pole Mounted Automatic Voltage Regulator (PVR), the over-voltage prevention apparatus comprising:

a measurement unit for measuring voltages, currents, and phases at an installation point of the PVR and connection points of the one or more distributed generators;

a flow direction determination unit for determining a flow direction based on the voltage, current, and phase at the installation point of the PVR measured by the measurement unit; and a control unit for regulating the dispatched voltage according to the current at the installation point of the PVR, if the flow direction is a forward direction, and regulating the dispatched voltage to satisfy ranges of a first admissible voltage and a second admissible voltage by calculating the first admissible voltage and the second admissible voltage based on the voltages at the connection points of the one or more distributed generators and the voltage at the installation point of the PVR, if the flow direction is a backward direction, as a result of determining the flow direction in the flow direction determination unit;

wherein the control unit calculates a first voltage difference, which is the voltage s difference between a maximum distributed voltage, which is a maximum voltage among the voltages at the connection points of the one or more distributed generators, and a maximum specified voltage, which is an upper limit value of a specified voltage range of the distribution line in the case that the flow direction is the backward direction, wherein the control unit sets a voltage obtained by lowering the voltage at the installation point of the PVR by the first voltage difference to an upper limit value of the first admissible voltage, and sets a voltage obtained by lowering the upper limit value of the first admissible voltage by a predetermined dead band to a lower limit value of the first admissible voltage, and sets a median between the upper limit value of the first admissible voltage and the lower limit value of the first admissible voltage to the first admissible voltage.

2. The over-voltage prevention apparatus of claim 1,
wherein the control unit estimates a maximum estimated voltage which is the maximum voltage among the voltages of the distributed generators if outputs of the one or more distributed generators are increased from a current output to 100%, and calculates a second voltage difference which is the voltage difference between the maximum estimated voltage and a maximum specified voltage, which is an upper limit value of a specified voltage range of the distribution line in the case that the flow direction is the backward direction.

3. The over-voltage prevention apparatus of claim 2,
wherein the control unit sets a voltage obtained by lowering the voltage at the installation point of the PVR by the second voltage difference to an upper limit value of the second admissible voltage, and sets a voltage obtained by lowering the upper limit value of the second admissible voltage by a predetermined dead band to a lower limit value of the second admissible voltage, and sets a median between the upper limit value of the second admissible voltage and the lower limit value of the second admissible voltage to the second admissible voltage.

4. The over-voltage prevention apparatus of claim 3,
wherein the control unit sets the median between the upper limit value of the first admissible voltage and the lower limit value of the second admissible voltage to a final admissible voltage, and controls so that the dispatched voltage is output as the final admissible voltage.

5. The over-voltage prevention apparatus of claim 1,
wherein the control unit sets the median between the upper limit value of the first admissible voltage and the lower limit value of the second admissible voltage to a final admissible voltage, and controls so that the dispatched voltage is output as the final admissible voltage.

6. The over-voltage prevention apparatus of claim 1,
wherein the flow direction determination unit determines a direction in which the flow is maintained within a certain time or more as the flow direction.

7. The over-voltage prevention apparatus of claim 1,
wherein the control unit regulates so that the dispatched voltage is increased if the current at the installation point of the PVR is a specific value or more, and regulates so that the dispatched voltage is lowered if the current at the installation point of the PVR is smaller than the specific value in the case that the flow direction is the forward direction.

8. An over-voltage prevention method of controlling a dispatched voltage of a distribution line connected with one or more distributed generators by using a Pole Mounted Automatic Voltage Regulator (PVR), the over-voltage prevention method comprising:
measuring, by a measurement unit, voltages, currents, and phases at an installation point of the PVR and connection points of the one or more distributed generators;
determining, by a flow direction determination unit, a flow direction based on the voltage, current, and phase at the installation point of the PVR measured by the measurement unit; and
regulating, by a control unit, the dispatched voltage according to the current at the installation point of the PVR, if the flow direction is a forward direction, and regulating the dispatched voltage to satisfy ranges of a first admissible voltage and a second admissible voltage by calculating the first admissible voltage and the second admissible voltage based on the voltages at the connection points of the one or more distributed generators and the voltage at the installation point of the PVR, if the flow direction is a backward direction, as a result of determining the flow direction in the flow direction determination unit;
wherein in the regulating of the dispatched voltage, the control unit calculates a first voltage difference, which is the voltage difference between a maximum distributed voltage, which is a maximum voltage among the voltages at the connection points of the one or more distributed generators, and a maximum specified voltage, which is an upper limit value of a specified voltage range of the distribution line in the case that the flow direction is the backward direction,
wherein in the regulating of the dispatched voltage, the control unit sets a voltage obtained by lowering the voltage at the installation point of the PVR by the first voltage difference to an upper limit value of the first admissible voltage, and sets a voltage obtained by lowering the upper limit value of the first admissible voltage by a predetermined dead band to a lower limit value of the first admissible voltage, and
sets a median between the upper limit value of the first admissible voltage and the lower limit value of the first admissible voltage to the first admissible voltage.

9. The over-voltage prevention method of claim 8,
wherein in the regulating of the dispatched voltage,
the control unit estimates a maximum estimated voltage which is the maximum voltage among the voltages of the distributed generators if outputs of the one or more distributed generators are increased from a current output to 100%, and calculates a second voltage difference which is the voltage difference between the maximum estimated voltage and a maximum specified voltage, which is an upper limit value of a specified voltage range of the distribution line in the case that the flow direction is the backward direction.

10. The over-voltage prevention method of claim 9,
wherein in the regulating of the dispatched voltage,
the control unit sets a voltage obtained by lowering the voltage at the installation point of the PVR by the second voltage difference to an upper limit value of the second admissible voltage, and sets a voltage obtained by lowering the upper limit value of the second admissible voltage by a predetermined dead band to a lower limit value of the second admissible voltage, and
sets a median between the upper limit value of the second admissible voltage and the lower limit value of the second admissible voltage to the second admissible voltage.

11. The over-voltage prevention method of claim 9,
wherein in the regulating of the dispatched voltage,
the control unit sets the median between the upper limit value of the first admissible voltage and the lower limit value of the second admissible voltage to a final admissible voltage, and controls so that the dispatched voltage is output as the final admissible voltage.

12. The over-voltage prevention method of claim 8,
wherein in the regulating of the dispatched voltage,
the control unit sets the median between the upper limit value of the first admissible voltage and the lower limit value of the second admissible voltage to a final admissible voltage, and controls so that the dispatched voltage is output as the final admissible voltage.

13. The over-voltage prevention method of claim 8,
wherein in the determining of the flow direction,
the flow direction determination unit determines a direction in which the flow is maintained within a certain time or more as the flow direction.

14. The over-voltage prevention method of claim 8,
wherein in the regulating of the dispatched voltage,
the control unit regulates so that the dispatched voltage is increased if the current at the installation point of the PVR is a specific value or more, and regulates so that the dispatched voltage is lowered if the current at the installation point of the PVR is smaller than the specific value in the case that the flow direction is the forward direction.

\* \* \* \* \*